Feb. 18, 1941.    G. E. HENNING ET AL    2,231,910
CABLE-MAKING APPARATUS
Original Filed Dec. 13, 1938    11 Sheets-Sheet 1
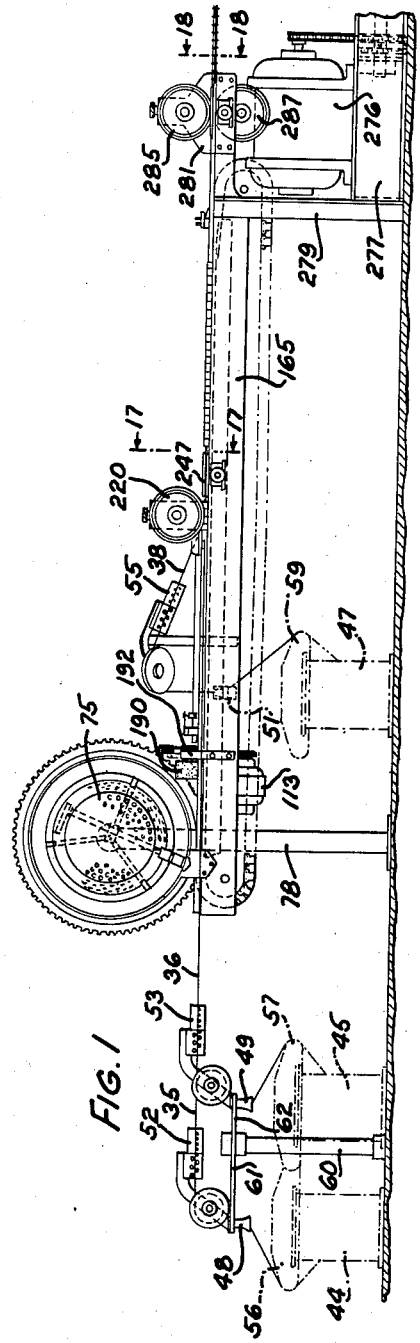
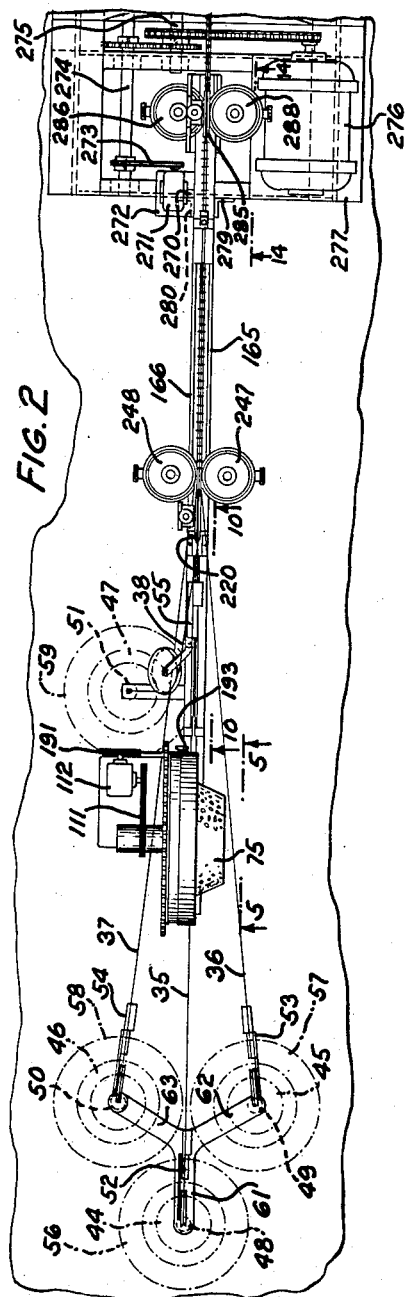
INVENTORS
G. E. HENNING
F. V. JOHNSON—DECEASED
BY L. T. JOHNSON—EXECUTRIX
S. THRONSEN
BY
E. R. Nowlan
ATTORNEY Feb. 18, 1941. G. E. HENNING ET AL 2,231,910
CABLE-MAKING APPARATUS
Original Filed Dec. 13, 1938 11 Sheets-Sheet 2
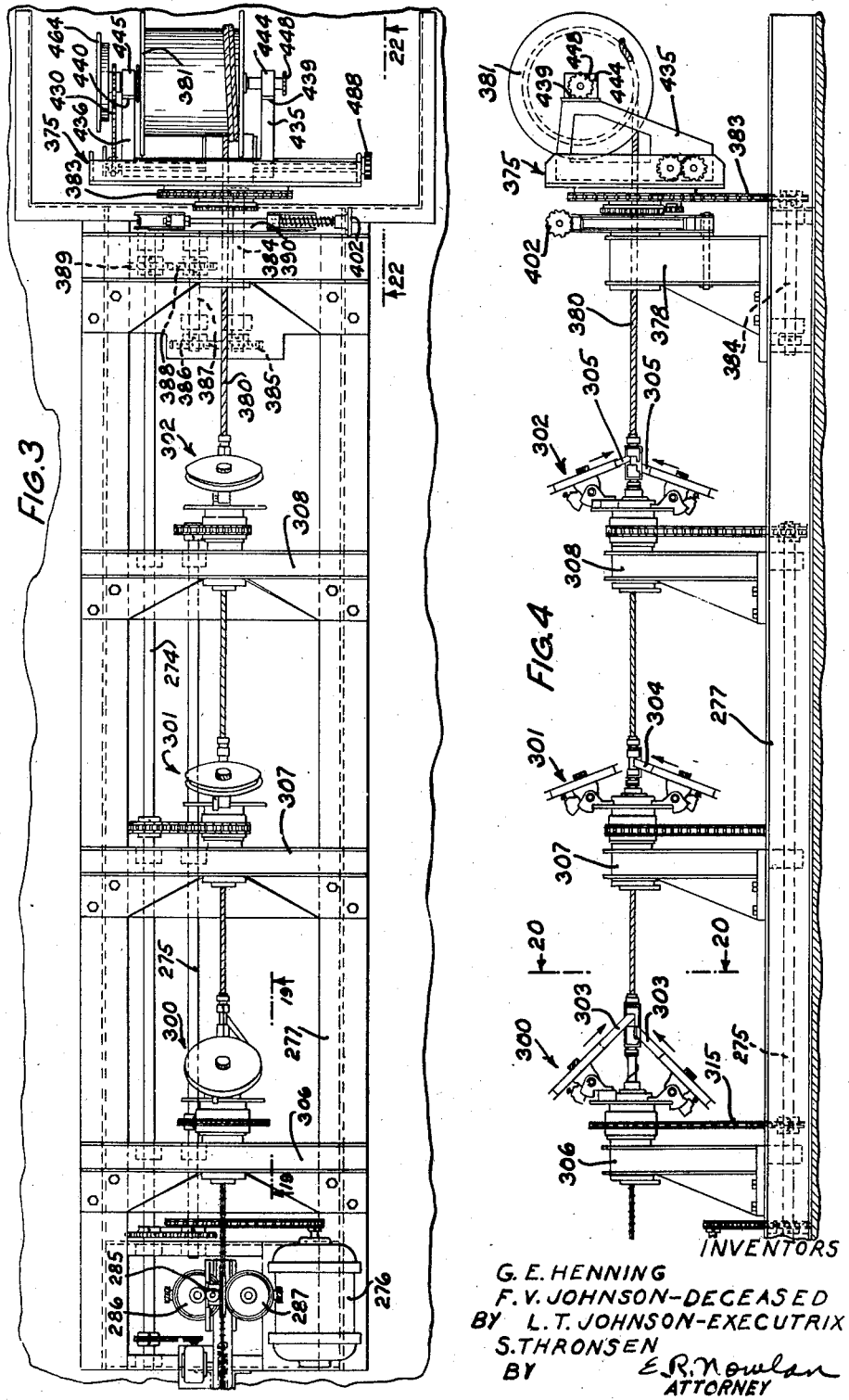
INVENTORS
G. E. HENNING
F. V. JOHNSON-DECEASED
BY L. T. JOHNSON-EXECUTRIX
S. THRONSEN
BY E. R. Nowlan
ATTORNEY Feb. 18, 1941.                G. E. HENNING ET AL                2,231,910
                               CABLE-MAKING APPARATUS
                    Original Filed Dec. 13, 1938    11 Sheets-Sheet 3
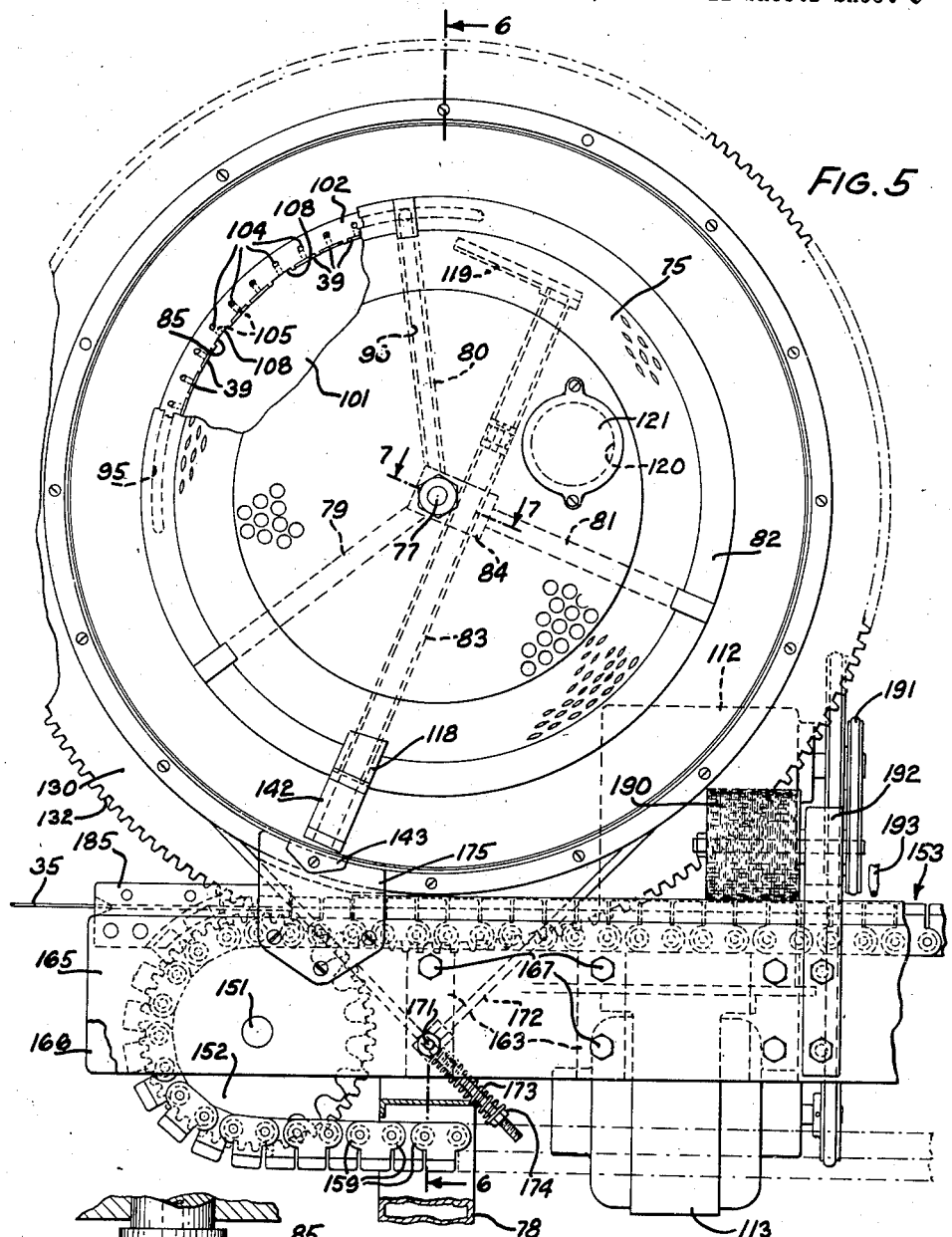
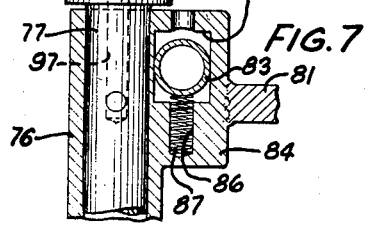
INVENTORS
G. E. HENNING
F. V. JOHNSON-DECEASED
BY L. T. JOHNSON-EXECUTRIX
S. THRONSEN
BY
            E. R. Nowlan
                 ATTORNEY

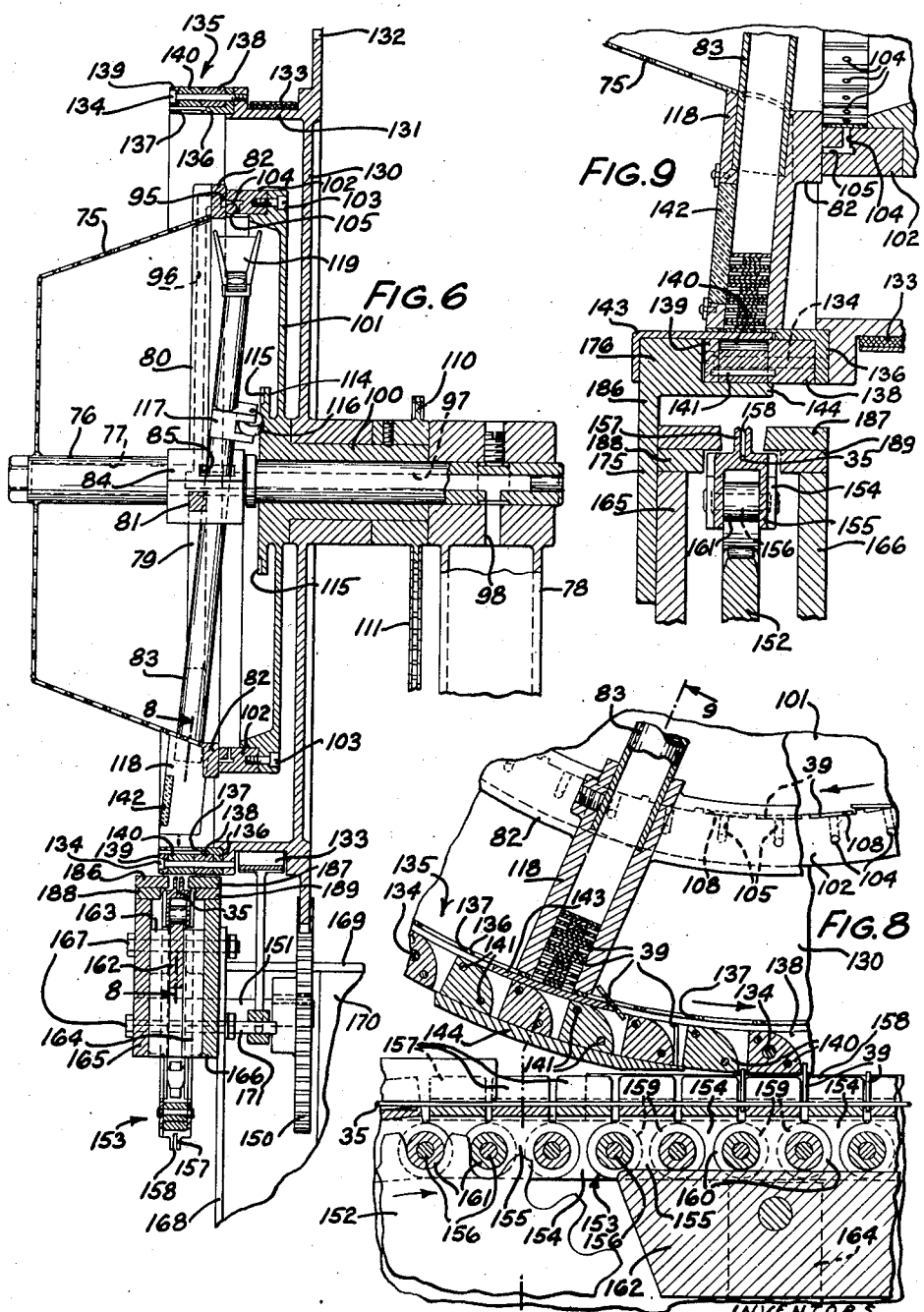

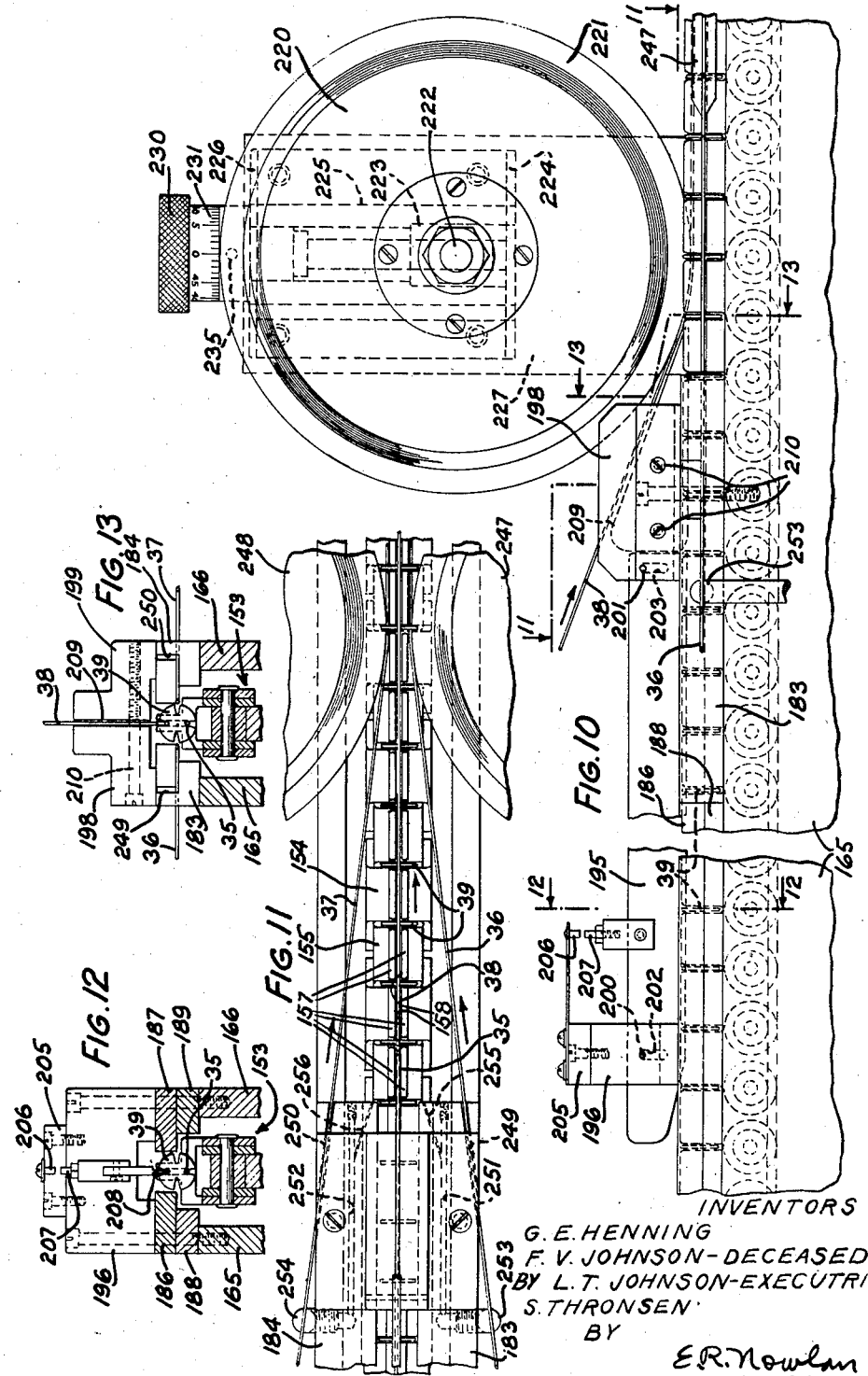

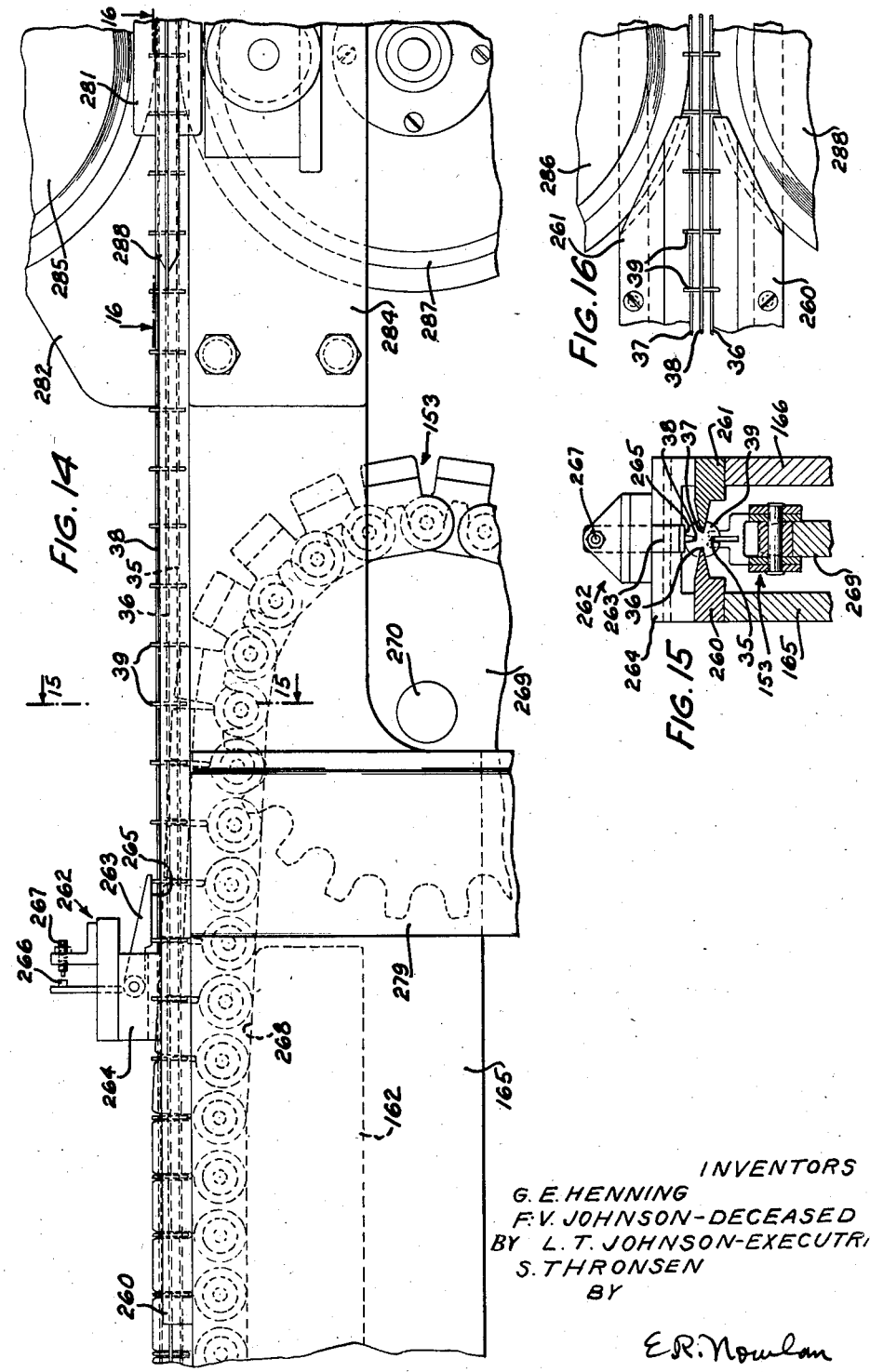

Feb. 18, 1941. G. E. HENNING ET AL 2,231,910
CABLE-MAKING APPARATUS
Original Filed Dec. 13, 1938 11 Sheets-Sheet 7
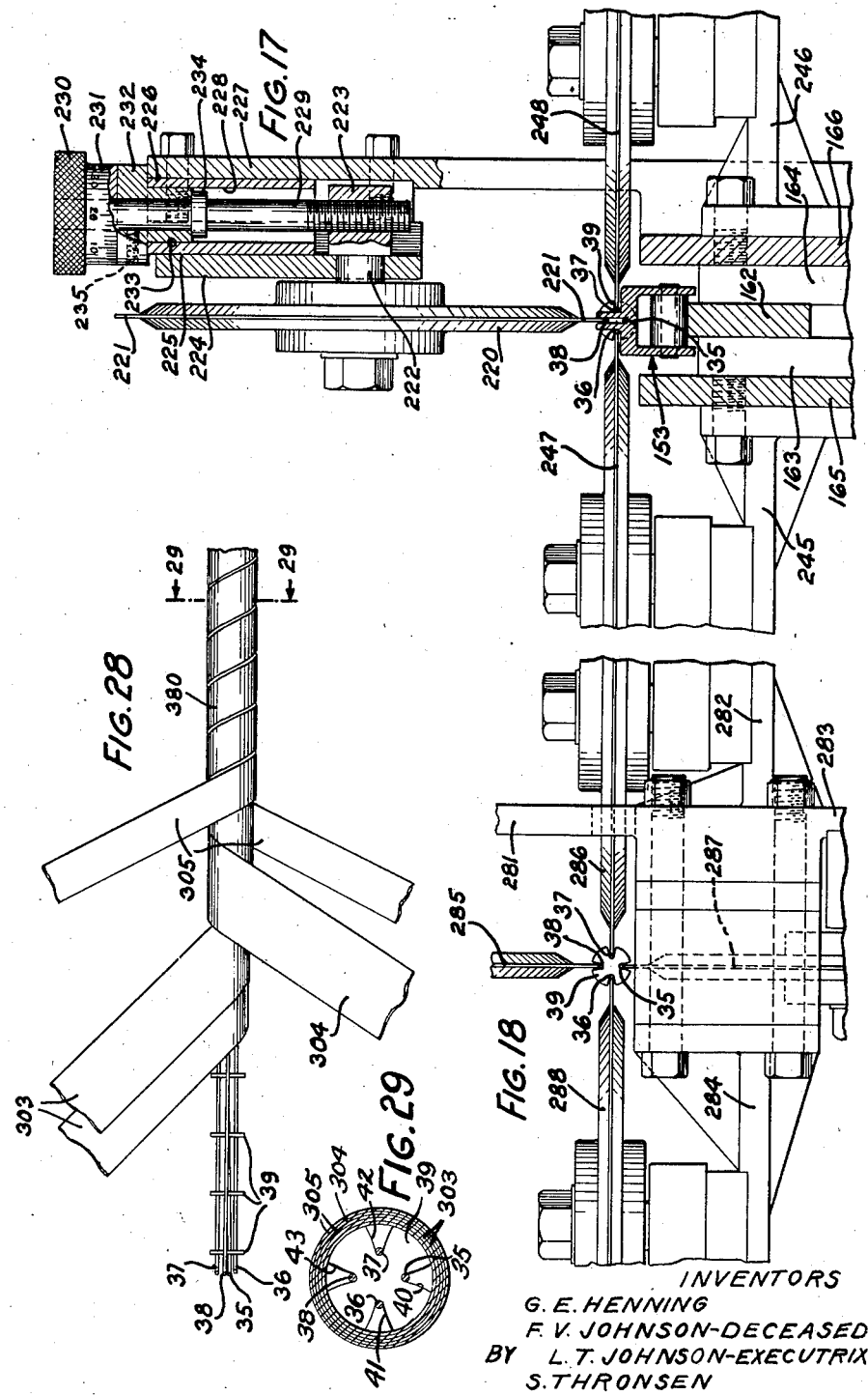
INVENTORS
G. E. HENNING
F. V. JOHNSON-DECEASED
BY L. T. JOHNSON-EXECUTRIX
S. THRONSEN
BY E. R. Nowlan
ATTORNEY Feb. 18, 1941.  G. E. HENNING ET AL  2,231,910
CABLE-MAKING APPARATUS
Original Filed Dec. 13, 1938    11 Sheets-Sheet 8
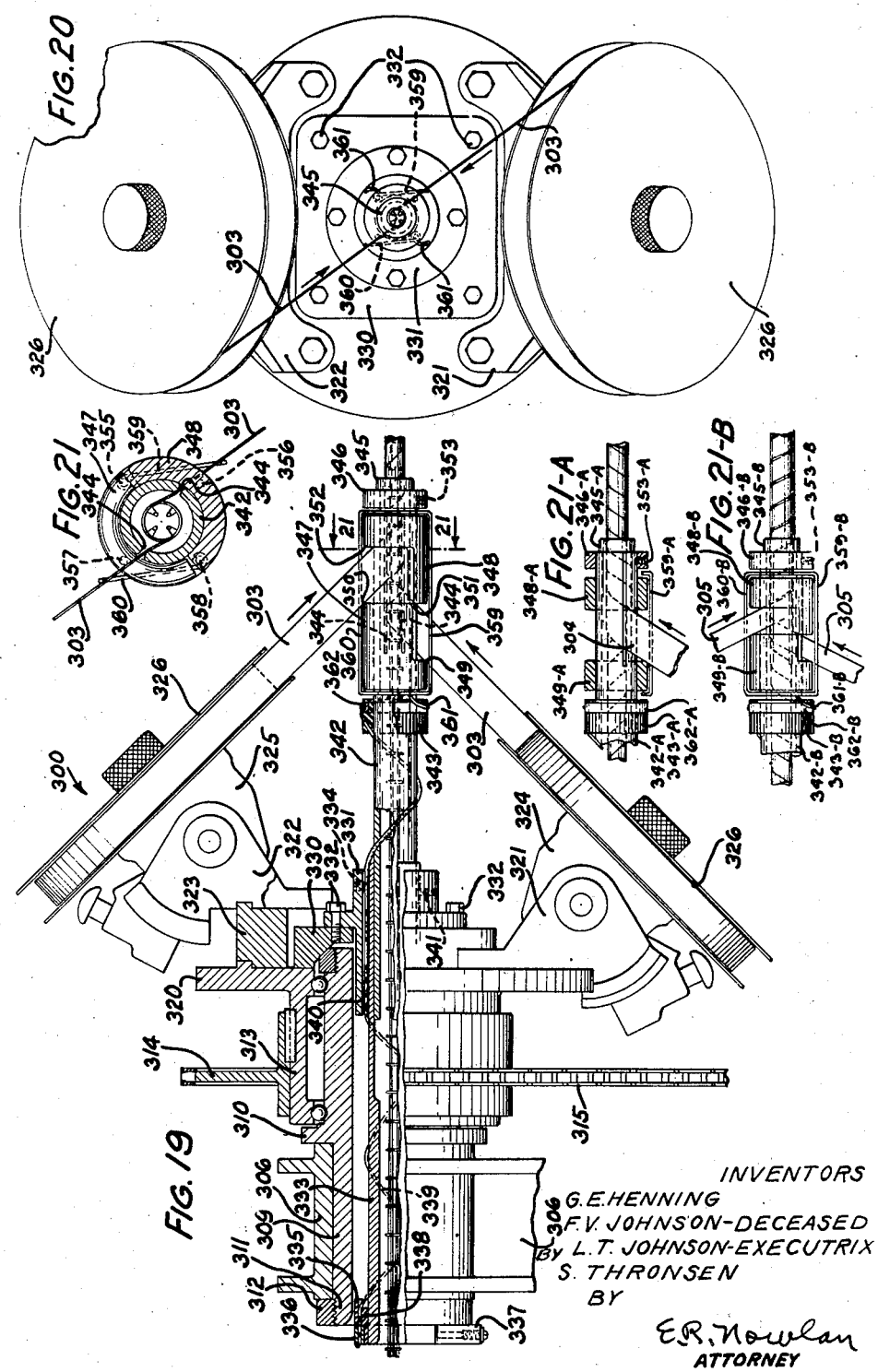
INVENTORS
G. E. HENNING
F. V. JOHNSON-DECEASED
By L. T. JOHNSON-EXECUTRIX
S. THRONSEN
BY
E. R. Nowlan
ATTORNEY

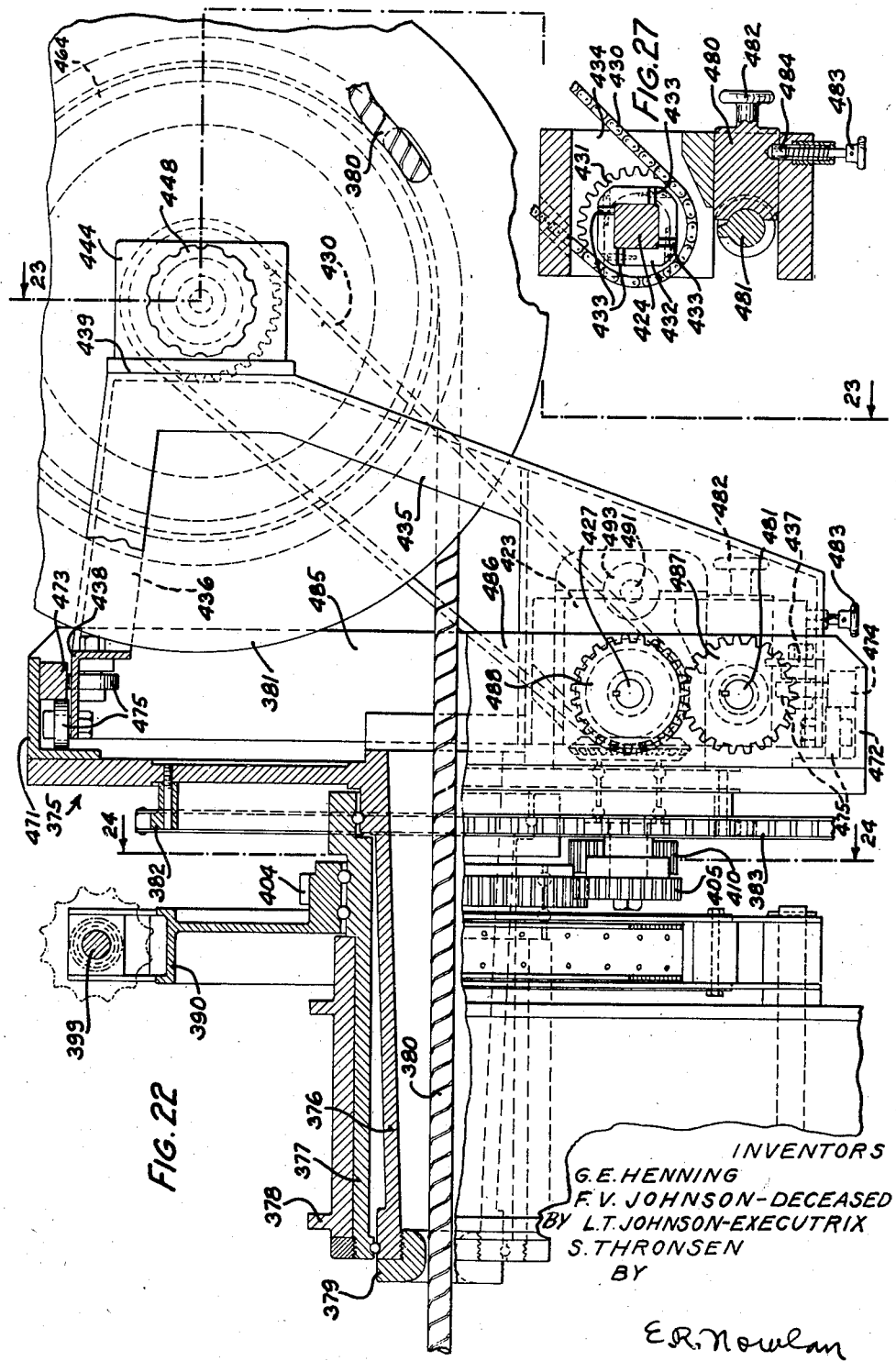

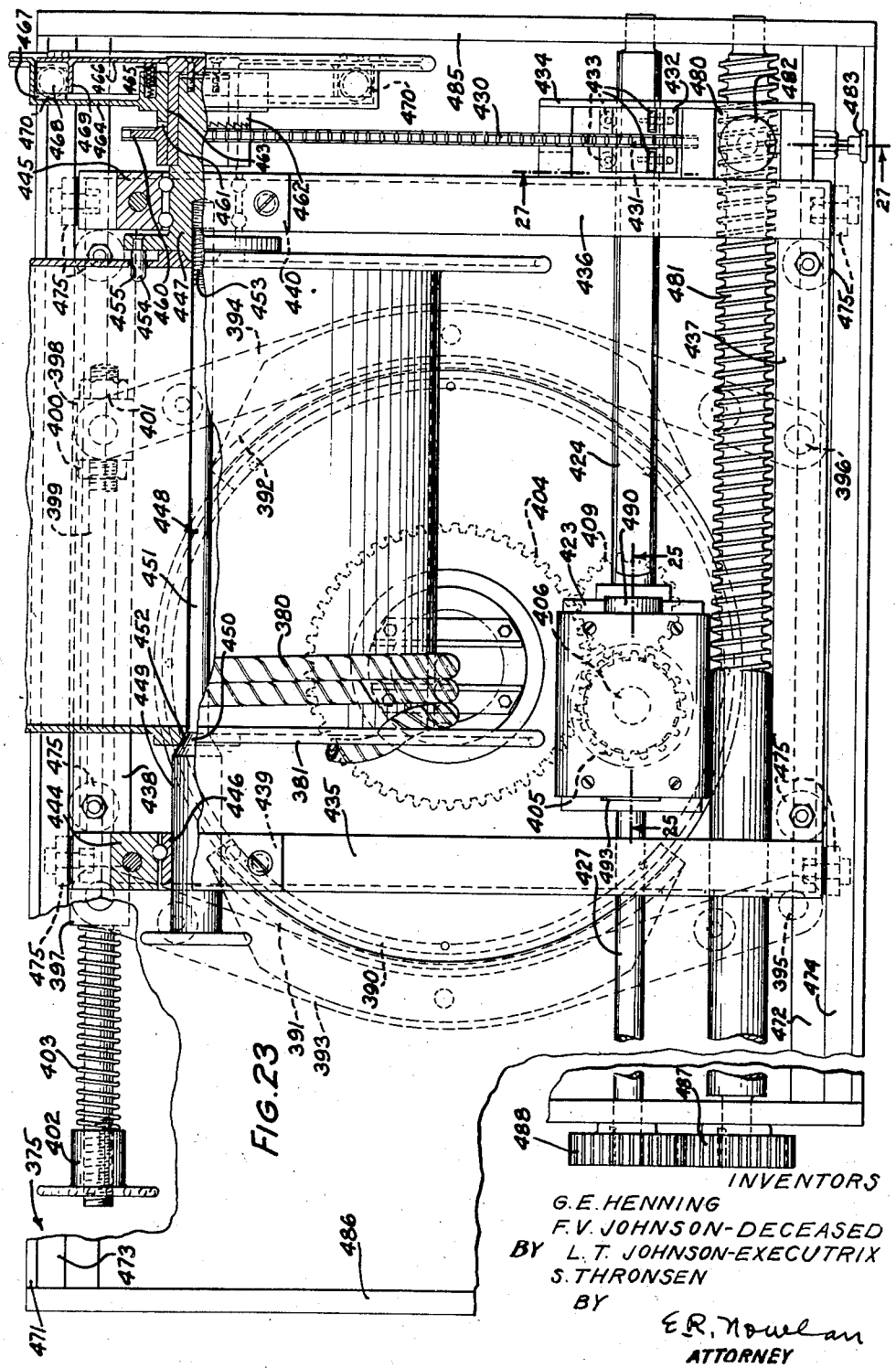

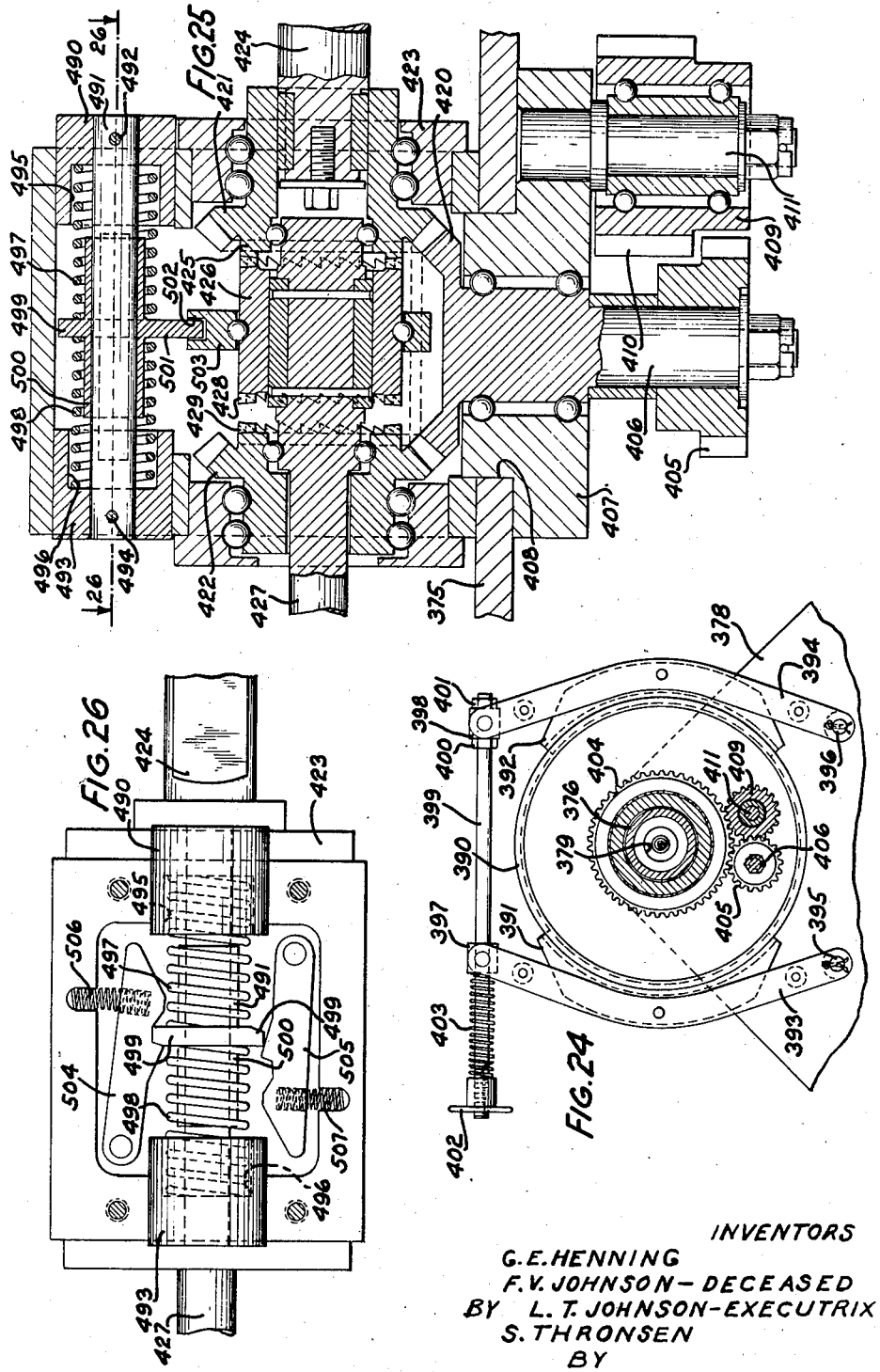

Patented Feb. 18, 1941

2,231,910

UNITED STATES PATENT OFFICE 2,231,910

CABLE-MAKING APPARATUS

George E. Henning, Joppa, Md., and Fred V. Johnson, deceased, late of Baltimore, Md., by Lila T. Johnson, executrix, Baltimore, Md., and Sigurd Thronsen, Baltimore, Md., assignors to Western Electric Company, Incorporated, New York, N. Y., a corporation of New York Original application December 13, 1938, Serial No. 245,540. Divided and this application February 7, 1940, Serial No. 317,656

12 Claims. (Cl. 173—244)

This invention relates to cable-making apparatus and more particularly to apparatus for making cable, which comprises a plurality of wires held apart by insulators engaging the wires at spaced intervals and is a division of our copending application Serial No. 245,540, filed December 13, 1938, covering Cable-making apparatus.

Recent developments in the communications field have indicated the desirability of providing cables for certain purposes comprised of a plurality of strands of conducting material spaced one from another and sheathed with a suitable covering without using a solid layer of dielectric between the strands but rather by providing washers or spacing members placed at regularly spaced intervals throughout the length of the cable for holding the conducting strands in spaced relation.

It is an object of the present invention to provide a cable making apparatus for assembling wires and their insulating spacers in a predetermined relation with a high degree of accuracy.

In accordance with a preferred embodiment of the invention, an apparatus for making a cable of four wires twisted with respect to each other and spaced one from another by spacers positioned throughout the length of the cable at predetermined intervals comprises four major portions, which are: a wire-feeding mechanism, a spacer and wire assembling mechanisms, a taping mechanism, and a twisting and takeup mechanism. In this embodiment of the invention, four reels of wire are positioned to be fed to an assembling apparatus by means of suitable guides which direct the wire into slots formed in spacers fed in a predetermined path by the spacer and wire assembling mechanism. The spacer and wire assembling mechanism includes a hopper and a spacer-feeding device associated therewith for feeding spacers one at a time into a chainlike spacer-carrying device which advances the spacers in their predetermined spaced relation while the wires are forced into slots in the spacers. At the end of the spacer and wire assembling fixture, micrometrically adjustable rolls are provided for forcing or rolling the wires a predetermined distance into the slots in the spacers and a set of guide members are provided for holding the wire and spacers in a predetermined plane during the assembly thereof. The apparatus for sheathing the formed cable and for twisting the wires is positioned adjacent the wire and spacer assembling mechanism and comprises a series of taping heads and a twisting takeup head, which imparts a spiral twist to the assembled spacers and wires as they are fed through the taping mechanism. The taping mechanism during the passage of the wire therethrough applies paper tapes, a copper tape and two steel tapes to the cable as it is drawn to the twisting takeup head.

A better understanding of the invention may be had by reference to the following detailed description when considered in conjunction with the accompanying drawings, wherein Fig. 1 is a side elevational view of the wire supply and spacer-assembling mechanism;

Fig. 2 is a plan view of the apparatus shown in Fig. 1;

Fig. 3 is a plan view of the taping mechanism and the twisting takeup mechanism, and when placed to the right of Fig. 2, discloses generally the entire plan view of the apparatus;

Fig. 4 is a side elevational view of the taping mechanism and the twisting takeup head and when placed to the right of Fig. 1, together with Fig. 1, discloses generally the side elevational view of the entire apparatus;

Fig. 5 is an enlarged fragmentary side elevational view of the hopper and a portion of the spacer feeding mechanism, or, in other words, that portion of the machine which may be seen when viewing the apparatus along the line 5—5 of Fig. 2 in the direction of the arrows, parts of this figure being broken away to more clearly show the construction of the apparatus;

Fig. 6 is a fragmentary vertical sectional view taken on the line 6—6 of Fig. 5 in the direction of the arrows;

Fig. 7 is a fragmentary sectional view taken on the line 7—7 of Fig. 5 in the direction of the arrows showing some of the details of the construction of the hopper mechanism;

Fig. 8 is a fragmentary sectional view taken substantially along the line 8—8 of Fig. 6 in the direction of the arrows;

Fig. 9 is a fragmentary sectional view taken substantially along the line 9—9 of Fig. 8 in the direction of the arrows;

Fig. 10 is an enlarged fragmentary side elevational view of a portion of the wire and spacer assembling apparatus showing one of the micrometrically adjustable elements for setting a wire into the spacers, parts of the apparatus being broken away to conserve space, and the figure showing, on an enlarged scale, that portion of the apparatus which would be in view when looking in the direction of the arrows along the line 10—10 of Fig. 2;

Fig. 11 is a partial plan view of that part of the apparatus which may be seen looking in the direction of the arrows along the line 11—11 of Fig. 10 in the direction of the arrows;

Figs. 12 and 13 are fragmentary sectional views taken on the lines 12—12 and 13—13, respectively, of Fig. 10 in the direction of the arrows;

Fig. 14 is a fragmentary side elevational view of the elements which force the wires into the spacers if they have not been properly positioned by the other wire setting elements and shows those parts which may be viewed along the line 14—14 of Fig. 2 in the direction of the arrows;

Figs. 15 and 16 are fragmentary sectional and plan views, respectively, taken along the lines 15—15 and 16—16, respectively, of Figs. 14 in the direction of the arrows;

Figs. 17 and 18 are enlarged fragmentary vertical sectional views taken substantially along the lines 17—17 and 18—18, respectively, of Fig. 1 in the direction of the arrows;

Fig. 19 is an enlarged side elevational view, partly in section, of the paper tape serving mechanism showing the apparatus, which may be viewed looking in the direction of the arrows along the line 19—19 of Fig. 3;

Fig. 20 is an enlarged fragmentary sectional view taken on the line 20—20 of Fig. 4 in the direction of the arrows;

Fig. 21 is a fragmentary sectional view taken along the line 21—21 of Fig. 19 in the direction of the arrows;

Figs. 21—A and 21—B are sectional and plan views, respectively, of portions of the taping heads for applying the copper and steel tapes, respectively, and are similar to the structure shown in the right end of Fig. 19;

Fig. 22 is an enlarged fragmentary side elevational view, partly in section, of the twisting takeup mechanism, as viewed along the line 22—22 of Fig. 3 in the direction of the arrows;

Fig. 23 is a fragmentary sectional view taken along the line 23—23 of Fig. 22 in the direction of the arrows;

Fig. 24 is a fragmentary vertical sectional view taken on the line 24—24 of Fig. 22 in the direction of the arrows on a somewhat reduced scale;

Fig. 25 is an enlarged fragmentary sectional view taken on the line 25—25 of Fig. 23 in the direction of the arrows;

Fig. 26 is a sectional view taken on the line 26—26 of Fig. 25 in the direction of the arrows;

Fig. 27 is a fragmentary sectional view taken on the line 27—27 of Fig. 23 in the direction of the arrows;

Fig. 28 is an enlarged view of the completed cable with part of the wrappings of paper, copper and steel partially unwound therefrom to illustrate the construction of the completed cable; and Fig. 29 is an enlarged partial sectional view taken through the completed cable shown in Fig. 28, the section being enlarged and exaggerating the thickness of the tapes to more clearly show them.

Before referring in detail to the drawings, it will be noted that the detailed description of the structure shown thereon has been divided into three parts in order to simplify the description thereof. These three parts comprise the wire and spacer assembling mechanism, the taping mechanism, and the twisting takeup mechanism.

In the drawings, which will now be discussed in detail, the same parts have been given the same reference numerals throughout the several views and the first part of the apparatus to be described is the wire and spacer assembling mechanism.

*Wire and spacer assembling mechanism*

In the present embodiment of the invention, four wires 35, 36, 37 and 38 are to be assembled with spacers 39. The spacers are flat rubber discs having slots 40, 41, 42 and 43 formed therein into which the apparatus forces the wires 35, 36, 37 and 38, respectively. In the drawings the slots 40, 41, 42 and 43 have been designated only in Fig. 29 since the showing thereof in all views would obscure some features of the apparatus. The wires 35, 36, 37 and 38 are drawn in the operation of the machine from four supply spools 44, 45, 46 and 47 and directed through suitably tapered guides 48, 49, 50 and 51 to wire straightening devices 52, 53, 54 and 55, respectively. The supply spools 44, 45, 46 and 47 are shown in dot and dash lines in Figs. 1 and 2 and may be of any suitable type having caps 56, 57, 58 and 59 positioned thereon for permitting the easy withdrawal of the wire from the spools by the operation of the apparatus. Adjacent the supply spools 44, 45 and 46, there is a standard 60 which supports three arms 61, 62 and 63, which have the guides 48, 49 and 50 mounted in the ends thereof and which support the wire straightening devices 52, 53 and 54. The three spools 44, 45 and 46 and their associated apparatus are mounted at the left end of the apparatus and direct the wire from the spools 44, 45 and 46 to the disc and wire assembling mechanism, the three wires 35, 36 and 37 being the bottom and two sides wires of the cable while the wires and spacers are being assembled.

The hopper which feeds the spacers 39 into association with the wires 35, 36 and 37 is shown in detail in Figs. 5, 6, 7, 8 and 9 and comprises a perforated barrel 75 mounted on a sleeve 76, which is, in turn, fixed to a stud shaft 77. A hollow standard 78 supports the stud shaft 77 and the movable and stationary parts of the hopper mechanism. The sleeve 76 has three arms 79, 80 and 81 extending outwardly therefrom which constitute a spider for supporting a stationary ring 82 and a tube 83. An enlarged portion 84 formed integral with the sleeve 76 (Figs. 5, 6 and 7) has a slot 85 formed therein for receiving the tube 83. Seated in a cavity 86 in the enlarged portion 84 is a coil spring 87, which normally urges the tube 83 to the right (Fig. 6) in the slot 85. The stationary ring 82 has an arcuately shaped groove 95 formed therein which is in communication with a passageway 96 formed in the arm 80 of the spider. The passageway 96 in the arm 80 of the spider in turn communicates with a passageway 97 formed in the stud shaft 77, which in turn is interconnected with a passageway 98 leading into the hollow standard 78, which is, in turn connected to a suitable evacuating pump (not shown) whereby a suction is applied through the standard 78, stud shaft 77 and arm 80 to the groove 95.

Rotatably mounted upon the stud shaft 77 is a collar 100 carrying on its left end a disc 101 of slightly smaller diameter than the stationary ring 82. This disc 101 has a ring 102 fixed thereto by means of screws 103 and has a series of holes 104 equally spaced about its lefthand face (Fig. 6) in alignment with the groove 95 in the stationary ring 82 so that as the disc 101 is rotated, as will be described hereinafter, the holes 104 will be brought into communication with the groove 95 and the suction applied to the groove 95 will be also applied successively to the holes 104 as they move into association with the groove. Each of the holes 104 extends partway through the ring 102 and into communication with a radially extending hole 105, of which there is one drilled from the inner edge of the ring 102 to communicate with each of the holes 104. Each of the holes 105 is positioned in the center of a depression 108 in the ring 102 and will tend to hold a spacer 39 in position in the depression 108 as the ring 102 rotates. It will thus be apparent that the suction applied to the ring 102 will hold spacers 39, which have fallen into the depressions 108 by gravity, in the depression 108 as long as the holes 104 are in communication with the groove 95 in the stationary ring 82. The disc 101 is driven in a clockwise direction (Figs. 5 and 8) by means of a sprocket 110 (Fig. 6) fixed to the sleeve 100 and driven by a chain 111 (Figs. 2 and 6) which is in turn actuated by a speed reducer 112 driven from a motor 113 shown in Fig. 1.

Mounted at the left end of the sleeve 100 is a vibrator disc 114 having a series of depressions 115 formed therein for cooperation with a roller 116 mounted in a bearing 117 which surrounds the tube 83. The tube 83 will thus be vibrated against the pressure of the spring 87 and any of the spacers 39 which fall into the tube will be shaken to cause them to assume a flat position in the bottom of the tube. The bottom end of the tube 83 is pivotally mounted in a guide member 118 fixed to the stationary ring 82 and the upper end of the tube has a trough 119 mounted thereon for receiving spacers which have been carried by the ring 102 from the bottom of the hopper to the top thereof, the suction applied through the slot 95 serving to hold the spacers on the ring 102 while they are carried through that portion of the rotation of the ring 102, where gravity would tend to draw them out of the depressions 108. It will be noted, by reference to Fig. 5, that the groove 95 extends from a point just below the point where the parts would tend to fall out of the ring 102 to a point directly above the trough 119 so that the spacers picked up by the ring 102 at the bottom of the hopper will be carried to the top thereof and into position over the trough 119 where the suction on the spacers will be relieved due to the holes 104 moving out of association with the arcuately shaped groove 95. The face of the perforated barrel 75 has a relatively large opening 120 therein through which parts may be placed in the hopper and a cover plate 121 is provided for closing this opening.

Rotatably mounted on the sleeve 100 (Fig. 6) is a disc 130, which is somewhat larger in size than the disc 101, and which has a rim 131 extending outwardly therefrom and surrounding the ring 102. The peripheral edge of the disc 130 has gear teeth 132 formed thereon whereby the disc 130 is driven in a counterclockwise direction (Figs. 5 and 8) and the rim 131 has a brake band 133 almost completely surrounding it for applying a drag to the disc 130 so that its rotation will be smooth and in timed relation to the driving of other apparatus, to be described hereinafter. Positioned on the left face (Fig. 6) of the rim 131 and held in place thereon by the screws 134 is a spacer advancing and tilting assembly designated generally by the numeral 135.

The assembly 135 comprises a ring 136, L-shaped in cross section, and having a series of apertures 137 equally spaced about its horizontally extending arm. These apertures 137 are slightly larger in diameter than the diameter of the spacers 39. A spacer ring 138 is seated in the angle formed by the junction of the two arms of the L-shaped ring 136 and has cooperating therewith a flat ring 139, rectangular in cross section, through which the screws 134 extend. The flat ring 139 and the spacer rings 138 have interposed between them a plurality of spacer tilting members 140, which are flat on two sides and rounded on their other surface, and which are so mounted as to be in substantial alignment with the apertures 137. The spacer tilting members are provided with pins 141 for holding them in place between the flat ring 139 and the spacer ring 138 and some of them have apertures through which the screws 134 extend. The ring 136 is of such diameter that its horizontally extending arm will just engage the lower end of the guide member 118 as the ring is rotated. The portion of the horizontally extending arm of the ring 136, which engages the undersurface of the guide member 118, is of such thickness that spacers 39 in the guide member 118, which incidentally is provided with a window 142, will drop one at a time into the apertures 137 in the ring 136. A plate 143 is positioned to engage the outer surface of the ring 136 for a short distance adjacent the guide member 118 and supports the spacers 39 while they are in the apertures 137. It will thus be apparent that spacers 39 will drop from the guide member 118 onto the plate 143 each time an aperture 137 comes in direct alignment with the open end of the guide member 118 and that spacers will thus be drawn from the bottom of the pile in the guide member 118 one at a time and will be moved along the plate 143 until they reach its right end (Fig. 8), where they will drop off the plate 143 and into position between the adjacent spacer tilting members 140. As the spacers 39 fall onto the spacer tilting members, they will strike the rounded face thereof and be tilted to a substantially vertical position and will be prevented from falling through the space between the tilting members by a guide plate 144 until they have been carried to the right end of the guide plate (Fig. 8), where they will be permitted to drop from their position between the tilting members.

The disc 130 is driven by a gear 150, which meshes with the gear teeth 132 formed on the periphery of the disc and the gear 150 is mounted upon a shaft 151, which also carries an idler sprocket 152. The idler sprocket 152 supports a carrier chain 153, which serves to carry the spacers 39 while they are being assembled with the wires 35, 36, 37 and 38. The carrier chain 153 comprises a plurality of links 154 and 155, which are substantially U-shaped in configuration, as may be seen by reference to Fig. 9, and are interconnected by pins 156. All of the links 154 and 155 have upwardly extending projections 157 in each of which there is formed a slot 158 for receiving the wire 35. The upwardly extending projections 157 formed on the links 154 and 155 cooperate to provide spaced-apart portions between each pair of links wherein the spacers 39 may be carried through the spacer and wire assembling section of the machine. The links 154 are somewhat larger in cross section than the links 155 and have projecting ears 159 which extend over projecting ears 160 formed on the links 154. Positioned within each pair of projecting ears 160 is a roller 161, which engages in the teeth of sprocket 152 and rides on a plate 162 after they leave the sprocket. The plate 162 is positioned between a pair of spacer plates 163 and 164, of which there are provided a plurality spaced throughout the length of the plate 162. The spacer plates 163 and 164 are mounted upon supporting plates 165 and 166 by means of bolts 167—167, some of which extend through the supporting plates 165 and 166 and a standard 168, which is rigidly fixed to a pair of plates 169 and 170 fixed to the hollow standard 78. The supporting plates 165 and 166 have the shaft 151 journalled therein and also support a tie bar 171, to which the brake band 133 is tied by means of a brake rod 172, one end of which is fixed to the tie bar 171 and the other end of which extends through the tie bar and is normally held taut on the rim 131 by means of a coil spring 173 surrounding the end of the rod 172 and interposed between a nut 174 on the rod and the tie bar 171. The supporting plate 165 also supports the plates 143 and 144, the plate 144 being formed integral with a bracket 175 which is fixed to the plate 165 and has an extending portion 176 on which the plate 143 is mounted. The left end (Figs. 1, 2 and 5) of the supporting plates 165 and 166 have a wire guide 185 mounted thereon for directing the strand of wire 35 into the slots 158 in the links of the carrier chain.

Since the idler sprocket 152 and the disc 130 are geared together, it is believed that it will be apparent that the spacer advancing and tilting assembly 135 will be rotated in timed relation to the movement of the carrier chain 153. Reference to Fig. 8 will make it clear that the spacers 39, which are dropped into the space between the spacer tilting members 140, will be carried along on the guide plate 144 until they come to the end of the plate 144 and thereafter will drop off the plate 144 into the slots between the links on the carrier chain 153. Since the assembly 135 and chain 153 are driven in synchronism, one spacer 39 will be dropped in each slot between the links of the carrier chain and will rest on the wire 35, which is in the slots 158 in the links 154 and 155, a pair of guide members 186 and 187 being provided for holding the spacers 39 against movement to the right or left (Figs. 6 and 9) and a pair of guide members 188 and 189 being provided for guiding the carrier chain during its movement. The guide members 186 and 187 are mounted on the guide members 188 and 189, respectively, which are in turn positioned on top of the supporting plates 165 and 166. The spacers thus deposited in the carrier chain will be moved to the right (Figs. 1, 2, 5 and 8) past a brush 190, which is rotated at relatively high speed by means of a belt 191 driven from the speed reducer 112 (Figs. 2 and 5). The brush 190 is mounted upon a bracket 192 which is secured to the plate 165 and extends over the guide members 186 and 187. The brush 190 is rotated at right angles or obliquely to the direction of travel of the carrier chain and will thus spin the spacers in the chain until one of the slots in the spacer engages the wire 35 and the spacer drops down away from the brush.

A blast of air delivered from a jet, such as is shown at 193, may be directed to the periphery of the spacers to supplement the brush 190 or the brush 190 may be omitted and the jet 193 connected to a suitable source of air under pressure may be used to rotate the spacers until the bottom slot in the spacer engages with the wire 35. The blast of air will also remove any foreign matter from the surfaces of the spacers.

As the spacers are carried to the right by the carrier chain 153, and after they have passed the brush, any spacer which was not properly seated on the wires 35, that is, any spacer which did not have one of its slots brought into registry with the wire 35, will be raised up above the top of the guide members 186 and 187, and as it moves forward, it will engage the underside of a bar 195 (Fig. 10) which is slidable vertically on a bridge member 196 and a pair of bridge members 198 and 199. The bar 195 is held in the bridge members by means of a pair of pins 200 and 201 set in the bridge member 196 and in the bridge members 198 and 199, respectively, and engaging in slots 202 and 203, respectively, in the bar 195. The bridge member 196 is mounted upon the guide members 186 and 187 and extends upwardly and over the carrier chain with the spacers on it, whereas the bridge members 198 and 199 are mounted on shouldered plates 183 and 184, which are in turn fixed to the supporting plates 165 and 166. The bridge member 196 has a block of insulating material 205 mounted thereon which carries a contact 206 adapted to be engaged by a contact 207 mounted on the bar 195 if the bar 195 is moved upwardly by a spacer not properly placed on the carrier chain. If the spacers 39, as they pass the bar 195, are in the proper position, an extending portion 208 of the bar will register with a slot in the spacer, as shown in Fig. 12. However, if any spacer happens to be turned out of its normal position and the wire 35 is not in one of the slots, the spacers will raise the bar 195, thereby to cause a circuit to be completed between the contacts 206 and 207 to establish other circuit connections (not shown) for stopping the machines and notifying the operator, by either an audible or visible signal, of the reason for the machine stopping. The bridge members 198 and 199 are bolted together by machine screws 210 and serve another purpose, that is, they cooperate with a substantially triangularly shaped member 209 interposed between them to serve as a guide for the wire 38.

Positioned closely adjacent the right end (Fig. 10) of the bridge members 198 and 199 and the triangularly shaped member 209 is the first pressure roll 220, of a series of pressure rolls, which serves to force the wire 38 firmly into the slots in the spacers 39. As may be seen, by reference to Figs. 10 and 17, the pressure roll 220 has a reduced section 221 at its periphery, which extends into the uppermost slot in the spacers 39 and will force the wire 38 down into the slot. The pressure roll is mounted upon a shaft 222 formed integral with a block 223 fixed in a plate 224, which is dove-tailed, as shown at 225, in a plate 226, which in turn is secured to a mounting bracket 227. The bracket 227 is suitably fixed to the supporting plate 166 and supports the plate 226, which has a hollow central portion 228 through which a screw 229 extends. Fixed to the upper end of the screw 229 is a knurled handle 230 having a reduced portion 231 on which there are suitably inscribed markings for indicating the degree of rotation of the screw 229 with respect to the block 223 in which it is threaded. The markings on the reduced portion 231 cooperate with a reference mark on a collar 232, which is keyed in the plate 226 by means of a tapered pin 233, and cooperates with a shoulder 234 formed on the screw 229 to hold the screw fixed against vertical movement. A set screw 235 is threaded into the collar 232 and may be set against the shank of the screw 229 to hold it in any one of its adjusted positions. It is believed to be apparent, by reference to Figs. 10 and 17, that rotation of the screw 229 will change the position of the pressure roll 220 with respect to the spacers 39 carried by the carrier chain 153.

A pair of brackets 245 and 246 are mounted on the supporting plates 165 and 166 and adjustably support pressure rolls 247 and 248, respectively. These two pressure rolls are identical in construction with the pressure roll 220 and serve to accurately position the wires 36 and 37 in the slots in the spacers 39 as the spacers are moved past them.

The wires 36 and 37 (Figs. 10 and 11) are passed through slots 249 and 250 in the shouldered plates 183 and 184, respectively, and the plates 183 and 184 have air passages 251 and 252 formed therein connected to a suitable source of air under pressure by pipes 253 and 254, respectively. The air under pressure passing through the passages 251 and 252 is directed by a pair of jets 255 and 256 onto spacers carried by the carrier chain 153 so that the spacers will be forced against the right-hand links 154 and 155 as the spacers move into association with the presser roll 220, whereby the spacers, in being forced onto their associated wires, will be spaced equal distances one from another. The assembled wires and spacers will continue to move to the right as the carrier chain 153 advances, and in so moving to the right, will arrive at the position shown in detail in Figs. 14 and 15, where the side slots in the spacers are engaged by two stabilizing fins 260 and 261 mounted on the supporting plates 165 and 166. These stabilizing fins will restrain the spacers against movement vertically as they are moved to the right in a horizontal plane and will carry them past a sensing device, designated generally by the numeral 262 which comprises an L-shaped sensing finger 263 pivotally mounted on a bridge 264 which is carried by the supporting plates 165 and 166. The sensing finger 263 is pivoted on the bridge 264 and has a horizontally extending surface 265 which engages the upper surface of the spacers as they pass by and this surface 265 is of sufficient length to span a little more than two of the spacers in position in the carrier chain. If a spacer is missing from the group strung on the four wires, the sensing finger 263 will tilt in a clockwise direction to bring a contact 266, mounted upon its vertically extending portion, into engagement with a fixed contact 267 to establish circuit connections, not shown, which will cause the machine to stop and indicate the condition which exists.

Shortly after the assembled wires and spacers pass the sensing finger 263, the carrier chain will start to recede from the spacers due to the fact that the upper surface of the plate 162 slopes downwardly, as shown at 268. As soon as the carrier chain 153 has moved downwardly from the spacers a sufficient distance so that it will not disturb their spacing in the manner just described, the chain passes onto its driving sprocket 269, which is mounted upon a shaft 270 extending outwardly from a speed reducer 271 (Fig. 2). The speed reducer 271 is mounted upon a platform 272 and is driven by means of a chain drive 273 from a main drive shaft 274. Reference to the right end of Figs. 1 and 2 and the left end of Fig. 3 shows that the main drive shaft 274 is geared to an auxiliary drive shaft 275, which is in turn driven by a main driving motor 276. The motor 276 is mounted on the left end of a supporting framework 277, at the left end of which (Figs. 1 and 2) there are a pair of upright standards 279 and 280. The upright standard 279 is fixed to and supports the supporting plate 165 and the standard 280 supports the supporting plate 166. Both of the supporting plates 165 and 166 extend to the right a short distance beyond the standards 279 and 280 (Figs. 1, 2, 3 and 14) and have mounted thereon brackets 281, 282, 283 and 284, which support four pressure rolls 285, 286, 287 and 288, which are identical in construction with the pressure roll 220, and which are supported in exactly the same manner on their associated brackets as was the pressure roll 220 on its bracket 227. As will be apparent, by reference to Figs. 1, 2, 3, 14, 16 and 18, the pressure rolls 285 and 286 and pressure rolls 287 and 288 are mounted to engage the wires at diametrically opposed points so that the wires will be set into the spacers an accurately measured and equal distance. From the pressure rolls 285, 286, 287 and 288 the assembled wires and spacers are directed to the taping mechanism.

*Taping mechanism*

The taping mechanism includes three taping heads, designated generally by the numerals 300, 301, and 302, which are substantially identical in construction and which apply two gap type paper tapes 303, one overlapping copper tape 304, and two gap type steel tapes 305, respectively, to the assembled spacers and wires. The only difference between the various taping heads lies in the dimensions of the guides which direct the layers of material to the assembled wires and spacers and therefore only the taping head 300 will be described in detail. Extending upwardly from the supporting framework 277, are three inverted V-shaped standards 306, 307 and 308, which are formed from channel members and suitable gusset plates and which bridge the framework 277 and extend upwardly therefrom to support the heads 300, 301 and 302, respectively. Mounted in the standard 306 is a tubular bearing member 309 which has a shoulder 310 for engaging one side of the standard 306 and which is threaded at 311 to receive a locking member 312 whereby the bearing 309 will be locked in position in the standard 306. A tubular head supporting member 313 is rotatably mounted upon the bearing 309 and has keyed thereto a sprocket 314 adapted to be driven by a chain 315, which is in turn driven by the auxiliary drive shaft 275.

The head supporting member 313 has a flanged portion 320, on which are mounted a pair of brackets 321 and 322, the bracket 321 being mounted directly on the flange 320 and the bracket 322 being spaced therefrom by means of a block 323. The brackets 321 and 322 have adjustable tape reel supporting members 324 and 325, respectively, mounted thereon. The tape reel supporting members 324 and 325 are adjustable angularly with respect to the brackets 321 and 322 so that the angle at which the tapes 303 are fed from their reels 326 may be adjusted to control the angle of feed thereof to the assembled spacers and wires. Also mounted upon the flange 320 is a substantially rectangular plate 330, which has a collar 331 fixed therein by means of screws 332. The collar 331 has a tubular member 333 fixed therein by means of set screws 334 threaded in the collar 331 and engaging the outer surface of the tubular member 333. At its left end (Fig. 19), the tubular member 333 carries an insulating bushing 335 having an annular member 336 fixed to its outer end for cooperation with a brush 337 mounted upon the locking member 312. The bushing 335 has an aperture 338 formed therein through which an insulated wire 339 passes for connection to the annular member 336. This wire 339 is wrapped around the tubular member 333 and extends through a slot 340 formed in the collar 331. Mounted in the tubular member 333 and fixed thereto, by means of a set screw 341, is a guide supporting tube 342 around which the insulated wire 339 is wrapped and to which there is fixed an annular insulating bushing 343.

The guide supporting tube 342 has a pair of rounded slots 344 formed therein and extending a substantial distance from the right end (Fig. 19) of the tube. There is a shouldered guide member 345, formed of two semi-circular halves, inserted into the right end (Fig. 19) of the tube 342 and having an internal diameter just slightly larger than the wires and spacers with the servings of paper tape 303 thereon. The member 345 is held in place in the end of the tube by a ring 346 surrounding the tube and compressing it against the member 345, set screws 353 being threaded in the ring 346 to compress the tube 342 on the guide member 345. Fixed to the tube 342 intermediate the ring 346 and the insulating bushing 343 are a pair of guide sleeves 347 and 348 which surround the tube and have rounded guide surfaces 349 and 350 and 351 and 352, respectively, which engage the edges of the paper tapes 303 to properly guide them into the rounded slots 344, from which they are directed to the assembled spacers and wires and are wrapped around the assembly, as shown in Fig. 21. Each of the guide members 347 and 348 has four pins 355, 356, 357 and 358 mounted on the outer ends thereof and these pins are adapted to receive control levers 359 and 360. It will be noted, by reference to Figs. 19, 20 and 21, that the control levers are pivoted on the pins 355 and 358 and are urged toward the pins 356 and 357 by the paper tapes 303 when the tapes are in the position shown in Figs. 19, 20 and 21. However, if one of the tapes 303 breaks, the weight of the lever associated with the broken tape will cause the lever to rock about its pivot pin 355 or 358 and cause an extending portion 361 to engage with an annular metallic member 362 mounted on the insulating bushing 343 and electrically connected to the wire 339. The levers 359 and 360 are in conducting engagement with the frame of the apparatus in their normal positions, and since the wire 339 is insulated from the frame of the apparatus, the engagement of the extending portion 361 of one of the levers 359 or 360 with the conducting ring 362 will close a circuit through the frame of the apparatus to the brush 337 to establish a circuit, not shown, which will stop the machine and indicate that a tape has broken.

In Figs. 21—A and 21—B, the taping guides for applying the overlapping copper tape and the two spaced steel tapes have been shown in some detail, the same reference numerals being used as were used in Fig. 19 for the paper tape guides but being given the exponent's A and B in Figs. 21—A and 21—B, respectively. It will be noted that there is only one copper tape applied to the cable and that this tape is applied in an overlapping relation, the guide members and control members being substantially the same as those disclosed in Fig. 19 for the application of paper tape. In like manner, Fig. 21—B illustrates the guide members and control mechanism for the two steel tapes.

It will be understood that as soon as the assembled wires and spacers leave the last pressure rolls 285, 286, 287 and 288, the twisting takeup mechanism begins to impart a twist to the assembled spacers and wires and that this twist is imparted to the spacers and wires as they pass through the taping heads. Thus, the completed cable will be wound on a reel in the takeup mechanism, which will now be described.

*Takeup mechanism*

As pointed out in the brief description of the drawings, the twisting takeup mechanism is shown in general in Figs. 3 and 4 and in detail in Figs. 22 to 27, to which reference will now be made. The takeup mechanism comprises a cradle 375, which has a tubular projection 376 extending to the left therefrom (Fig. 22) on which the entire cradle and its associated parts are mounted. The tubular projection 376 is mounted to rotate within a bearing 377 mounted upon a standard 378. The left end (Fig. 22) of the projection 376 has a guide member 379 threaded therein for guiding the completed cable, designated 380, to a takeup reel 381 on the cradle 375. Fixed to the cradle 375 is a sprocket 382 adapted to be driven by a chain 383. The chain 383, in the embodiment of the invention shown, is driven by a sprocket mounted on the end of a shaft 384 (Fig. 3) suitably journalled in the supporting framework 277. The shaft 384 carries, at is left end (Fig. 3), a gear 385, which meshes with a gear 386 mounted on a shaft 387, which is geared to the main drive shaft 274 by means of gears 388 and 389. The driving connection just described will rotate the entire cradle 375 in one direction to impart a twist to the cable 380. If it is desired to twist the cable in the opposite direction, the shaft 384 may be shifted to the position in which the shaft 387 is now shown and the shaft 387 eliminated, whereby the cradle 375 will be rotated in the opposite direction. Any suitable chain tightening device may be used for tightening the chain 383 on its sprocket 382 to compensate for the shifting of the shaft 384 from one position to another, as just described.

Rotatable on the outer surface of the bearing 377 (Figs. 22 and 24) is a brake drum 390 which has cooperating therewith a pair of brake shoes 391 and 392 mounted intermediate the ends of pivoted brake arms 393 and 394, respectively. The brake arms are pivoted at 395 and 396 adjacent their lower ends and are connected at their upper ends to a pair of sleeves 397 and 398, respectively. The sleeve 398 is held on the end of a brake rod 399 by means of a pair of nuts 400 and 401, and the sleeve 397 is slidable on the brake 399, which is threaded at its left end (Figs. 23 and 24) to receive a threaded hand wheel 402 between which and the sleeve 397 there is interposed a coiled spring 403 encircling the brake rod 399. By tightening or loosening the hand wheel 402, any desired tension may be applied to the brake drum 390 by means of the just described mechanism.

The brake drum 390 carries a ring gear 404 which meshes with a gear 405 mounted upon a shaft 406, journalled in the bearing block 407, which is fixed in an aperture 408 in the cradle 375. The bearing block 407 carries a normally unused idler gear 409 having relatively wide teeth 410, which, as shown in Fig. 25, are out of mesh with the gear 405, which, as shown in Fig. 22, meshes with the ring gear 404. The idler 409 is mounted upon a stud shaft 411, fixed in the bearing block 407 and serves no purpose when it is mounted as shown in Figs. 22 and 25. However, if the direction of twist imparted to the cable is reversed by changing the position of the shaft 384, it is necessary to change the direction of drive of the takeup reel 381 to compensate for the change in direction of twist imparted to the cable. This may be accomplished by reversing the gears 405 and 409, that is, turning them end for end on their respective shafts. This will cause the gear 405 to fall into a plane where it is out of mesh with the gear 404, but in mesh with the teeth of the gear 409 and the teeth 410 of the gear 409 will be in mesh with the ring gear 404. From the foregoing, it is believed to be apparent that regardless of the direction of twist imparted to the cable, the shaft 406 will be rotated in the same direction if the proper gear changes are made.

Carried by the shaft 406 (Fig. 25) on the end opposite the end on which the gear 405 is mounted, is a beveled gear 420, which meshes with a pair of beveled gears 421 and 422 rotatable in a transmission housing 423. The gear 421 is keyed to a shaft 424 and has formed on its left face (Fig. 25) a toothed clutch 425, which, as shown, is in engagement with a clutch member 426 slidably keyed to the end of a shaft 427, which is journalled in and freely rotatable in the gear 422. The clutch member 426 has formed on its left end clutch teeth 428 adapted to cooperate with the teeth of a clutch 429 formed on the righthand face (Fig. 25) of the gear 422 when the clutch member 426 is shifted to the left (Fig. 25). The shaft 424 drives the takeup reel 381 through a roller chain 430, which meshes with a sprocket 431 secured to a collar 432 (Figs. 23 and 27). The shaft 424 is square in the area thereof surrounded by the collar 432 and is engaged by four rollers 433—433, which are rotatable in the collar 432 so that the collar will slide freely along the shaft 424, as the cable 380 is distributed on the reel 381. The sprocket 431 and its supporting collar 432 are mounted within a casing 434, fixed to a reel supporting frame composed of angle members 435, 436, 437 and 438. The angle members 435 and 436, as shown in Fig. 22, are irregular in shape and extend outwardly to the right from the angle members 437 and 438 to provide a pair of vertically disposed surfaces 439 and 440 (Figs. 3, 4, 22 and 23) on which reel journal blocks 444 and 445, respectively, are mounted. Rotatably mounted in the reel journal blocks 444 and 445 are a pair of bearings 446 and 447, respectively, having a reel supporting screw 448 mounted therein. The screw 448 is provided with an enlarged portion 449, which tapers, as shown in 450, to a smaller diameter, as shown in 451. The tapered portion 450 of the screw 448 is adapted to engage in an aperture 452 in one head of the reel 381 and the portion 451 of the screw 448 is shown threaded at 453 to engage a correspondingly threaded portion in the bearing 447. The bearing 447 carries a finger 454 adapted to engage in an aperture 455 in the other head of the reel 381, whereby the reel 381 may be fixed to the bearings 446 and 447.

The right end (Fig. 23) of the bearing 447 has a sprocket 460 rotatable thereon and provided with a clutch face 461, which is normally engaged by a cooperating clutch face 462 formed on a collar 463 formed integral with a hand wheel 464. The collar 463 is normally urged to the left (Fig. 23) by a series of coil springs 465 seated in pockets in the collar and abutting a hand wheel 466. Adjacent their peripheries, the hand wheels 464 and 466 have radially extending plates 467 and 468 welded to them and the hand wheel 466 has an axially extending ring 469 fixed to it for supporting coil springs 470 in the space between adjacent plates 467 and 468, whereby the two hand wheels will be urged to rotate together. The springs 465 normally hold the clutch face 462 in engagement with the clutch face 461 so that the rotation of the sprocket 460, by the chain 430, will drive the hand wheel 464 and the springs 470 interposed between the plates 467 and 468 will tend to drive the hand wheel 466 with the sprocket. The hand wheel 466 is fixed to the bearing 447 and therefore the sprocket 460 will resiliently drive the bearing 447 to rotate the reel 381. Suitable markings are placed on the hand wheels 464 and 466 and the tension on the brake shoes 391 and 392 on the brake drum 390 may be regulated to drive the takeup reel 381 under the desired tension, as indicated by the displacement of the hand wheel 464 with respect to the hand wheel 466.

Mounted in the bottom end of the casing 434, as shown in Figs. 23 and 27, is a block 480 having the configuration at its left end (Fig. 27) of half a nut, that is, half a thread is formed in the block 480 to cooperate with a screw 481. The block 480 is provided with a handle 482, whereby it may be withdrawn from engagement with the screw 481 provided a spring-pressed plunger 483 has been withdrawn from a socket 484 in the block 480. The screw 481 is journalled in a side member 485 and a side member 486 of the cradle 375 and carries on its left end (Fig. 23) a gear 487, which meshes with a gear 488 mounted on the shaft 427.

The side members 485 and 486 of the cradle 375 are joined together at their upper ends by an angle member 471 and they are joined together at their bottom ends by another angle member 472. The angle members 471 and 472 have track members 473 and 474, respectively, fixed to them for engagement by rollers 475—475 rotatably mounted on the angle members 437 and 438 of the reel supporting frame. As shown in Figs. 22 and 23, two rollers 475 engage a horizontal surface of the track member 473, two rollers 475 engage a vertical surface of the track 473, two rollers engage a vertical surface of the track member 474 and two rollers engage a horizontal surface of the track member 474. From the foregoing, it is believed to be apparent that the reel supporting frame may be slid back and forth on the cradle 375 to move the reel 381 mounted thereon back and forth with respect to the guide member 379 to distribute the cable 380 on the reel 381.

As shown in Fig. 25, the shaft 427 is connected through the clutch member 426 to the gear 421, whereby the reel supporting frame will be driven to the left (Fig. 23) and this drive of the reel supporting frame to the left (Fig. 23) will continue until the angle member 436 engages a collar 490 fixed to a shaft 491 and slidable in the transmission housing 423. The collar 490 is pinned to the shaft 491 at 492 and a corresponding collar 493 is pinned to the shaft 491 at 494. The collars 490 and 493 have pockets 495 and 496 formed therein in which coil springs 497 and 498, respectively, are seated. The coil springs 497 and 498 abut a shoulder 499 formed on a sleeve 500, which is slidable on the shaft 491. The collar 499 has an extension 501 formed thereon which enters a slot 502 in a ring 503 fixed to the clutch member 426. A pair of latches 504 and 505 (Fig. 26) cooperate with the collar 499 to hold it in either of two positions, being urged into engagement with the collar by coil springs 506 and 507, respectively.

The just described mechanism comprises what is commonly known as a "load and fire" mechanism, which will hold the clutch member 426 in engagement with either the clutch face 425 or the clutch face 429, into which positions the clutch member will be moved by the snap action of the springs when the collar 490 or the collar 493 engages the angle members 435 or 436. When the clutch member 426 is moved from engagement with the clutch face 425 into engagement with the clutch face 429, the direction of rotation of the screw 481 will be reversed and the screw will continue to rotate in said reversed direction until the "load and fire" mechanism is reversed again by the forcing of the shaft 491 in the opposite direction, whereupon the direction of rotation of the screw will again be reversed and it will drive in the direction originally described to thus distribute the cable 380 on the reel 381.

It is believed that the following brief description of the mode of operation of the mechanism will aid materially in an understanding of the mode of operation of the apparatus.

Four strands of wire 35, 36, 37 and 38 having been drawn from the supply spools 44, 45, 46 and 47 and threaded through the machine to the reel 381 and fixed to the reel in any suitable manner, a supply of spacers 39 having been placed in the perforated barrel, and reels of paper, copper and steel tapes having been placed on the taping heads 300, 301 and 302, the motors 113 and 276 may be started to initiate the operation of the machine. The motor 113 will rotate the ring 102 and the ring will pick up spacers 39 from the bottom of the barrel 75 and carry them up to the trough 119, where they will be dropped into the tube 83. The motor 113 will also cause the tube 83 to vibrate through the engagement of the roller 116 with the depressions 115 on the vibrator disc 114, whereby the spacers carried from the bottom of the barrel 75 up to the trough 119 will be arranged in an orderly pile in the tube 83. The means for vibrating the tube 83 illustrates one form of device that may be used, but it will be understood that an electrical coil vibrator or any other suitable device may be used.

Spacers which have been piled up in the tube 83 will pass downwardly through the tube and assume the position shown in Fig. 8, where they are resting on the plate 143. As the motor 276 is started, the carrier chain 153 will start to advance, the drive for the carrier chain being supplied from the motor 276 through the main drive shaft 275 and auxiliary drive shaft 274, the chain 273 and speed reducer 271 to the main driving sprocket 269. The carrier chain 153 not only serves to advance the spacers 39 which it carries, but also drives the shaft 151 through the idler sprocket 152, which meshes with the carrier chain 153. The gear 150, which is mounted on the shaft 151, drives the disc 130 and the spacers, which are fed downwardly through tube 83 to the plate 143, will be picked off the plate 143 one at a time by the ring 136, rotating in timed relation to the drive of the carrier chain, and the spacers which are picked off the plate 143 will drop through the apertures 137 in the ring 136 and will fall into the space between adjacent spacer tilting members 140, where they will rest on their edges on the upper surface of the guide plate 144 until they reach the end of the guide plate and drop into the slots between the links 154 and 155 of the carrier chain 153. The brake band 133, in retarding the motion of the disc 130, will also take up any slack which there may be in the carrier chain 153 and insure that the space between the spacer tilting members 140 and the space between adjacent links 154 and 155 are in proper alignment so that the spacers will drop off of the plate 144 and into space between the projections 157 on the links.

As the carrier chain advances to the right, it will carry the spacers, which have dropped off the guide plate 144, to the right into association with the brush 190, driven by the motor 133, where the spacers will be spun by the brush 190 and the blast of air from the jet 193 or if the brush is not used, then by the blast of air until a slot in the spacer is engaged by the wire 35 and the spacers will thus be properly aligned with the wire 35 and carried to the right by the carrier chain until they come to the position where the wire 38 is fed to the uppermost slot in the spacers and is forced into the slot by the pressure roll 220. If any spacers are not properly aligned with the wire 35, the solid portion of the spacer will cause the bar 195 to move upwardly, thereby to move the contact 207 (Fig. 10) into engagement with the contact 206 to establish circuit conditions which will stop the machine and notify an operator of the condition which exists.

A continued movement of the spacers 39 and the wires 35 and 38 to the right will bring them into that portion of the machine illustrated in Fig. 11 where the blast of air from the jets 255 and 256 will force the spacers to the right against the upwardly extending projections 157 on the links to the right of the spacers (Fig. 11) just prior to the time when the wires 36 and 37 are guide into the side slots in the spacers by the pressure rolls 247 and 248. As the carrier chain 153 continues to carry the assembled spacers and wires to the right, the spacers will arrive at the position shown in Fig. 14, where the stabilizing fins 260 and 261 engage the side slots in the spacers and where the chain 153 recedes from the spacers, and as the spacers pass through this position, the sensing device 262 will determine whether the partially formed cable has arrived at this position with a spacer missing, and if a spacer is missing, the sensing finger 263 will tilt in a clockwise direction to move contact 266 into engagement with contact 267 to establish a circuit condition stopping the machine and notifying the operator that a spacer is missing from the assembly.

The assembled wires 35, 36, 37 and 38 and spacers 39 are advanced, from the point where the carrier chain 153 moves out of engagement with the spacers, by the twisting takeup mechanism and they will be drawn through the pressure rolls 285, 286, 287 and 288, which have been micrometrically adjusted, so that the wires will be forced into the slots in the spacers the desired distance, and as soon as the assembled wires and spacers move out of association with the pressure rolls 285, 286, 287 and 288, the twist will start to be imparted to the assembly while the assembly is passing through the taping mechanism.

In the taping mechanism, there are provided the three taping heads 301, 302 and 303, which apply two layers of paper tape, a single layer of copper tape applied in overlapping relation, and two layers of steel tape. The taping heads are rotated about the assembled wires and spacers by the chain 315 and the tapes are guided to the assembled spacers and wires by the guide sleeves 347 and 348, the rounded edges of which engage the edges of the tape and direct it through the slots 344 in the guide supporting tube 342. The direction of wrapping of the tape about the assembled wires and spacers may be reversed from that shown by driving the taping head 301 from the auxiliary drive shaft 275 instead of from the main drive shaft 274, and by driving the taping heads 300 and 302 from the main drive shaft 274, rather than from the main auxiliary drive shaft 275. If one of the tapes being applied to the assembled spacers and wires breaks, its associated control lever 359 or 360 will be released and will move its extending portion 361 into engagement with the annular members 362 to complete a circuit from the frame of the machine through the lever which has been released and the wire 339 and brush 337 to establish a circuit which will indicate that a tape has broken.

The reel cradle 375, which is rotated by means of the chain 383 in either of two directions, depending upon whether the shaft 384 is in the position shown or in the position now shown occupied by the shaft 387, rotates within the bearing 377 and as the cradle revolves, it carries with it the shaft 406, which carries the gear 405 in mesh with the ring gear 404. The ring gear 404, being fixed to the brake drum 390, will be permitted to rotate only when there is a predetermined tension on the cable 380 and therefore, if the brake shoes 391 and 392 were released from the brake drum 390, the brake drum and ring gear 404 would be free to rotate and no motion would be imparted to the takeup reel 381. However, when brake pressure is applied to the brake drum 390, there will be a speed variation between the drum 390 and the cradle 375, whereby the gear 405 will proceed to walk about the ring gear 404, rotating the shaft 406 and rotating the takeup reel through the beveled gears 420 and 423, shaft 424 and chain 430 driven from the shaft 424.

The tension under which the cable is drawn through the machine will be indicated by the relative displacement of the hand wheels 464 and 466 in the following manner. The reel 381 is driven by the sprocket 460, the clutch face 461 of which meshes with the clutch face 462 on the collar 463 formed integral with the hand wheel 464, which is in turn connected through the springs 470 to the hand wheel 466 fixed to the bearing 447, on which the reel is secured. As tension increases on the cable being drawn through the machine, the hand wheels 464 and 466 will be displaced relative to each other as the springs 470 are compressed and the amount of the displacement will be the measure of the amount of tension on the cable, and when this tension has increased to the desired amount, the brake shoes 391 and 392 may be released slightly to permit the brake drum 390 to rotate with that predetermined amount of displacement between the hand wheels 464 and 466. After the brake shoes 391 and 392 have been set to apply the proper tension to the cable, they will require practically no attention, but will maintain the cable under that tension since any slack in the cable will be taken up by the springs 470 driving the driven member or bearing 447.

It is believed to be thus apparent that the reel 381 may be rotated in timed relation to the drive of the carrier chain while maintaining the cable being reeled on the reel under a selected tension. As the reel rotates to wind the cable 380 on it, the framework, comprised of the angle members 435, 436, 437, and 438, which carry the reel, will be shifted across the cradle 375 by the distributing mechanism, which includes the screw 481 and the block 480, and as the reel moves across the cradle during the rotation of the cradle, the cable 380 will be distributed across the drum of the reel from one head thereof to the other, the direction of rotation of the screw 481 being reversed each time one of the colars 490 or 493 is pushed against its associated angle member 436 or 435, with sufficient force to snap the latches 504 or 505 into and out of latching engagement with the shoulder 499.

Although a specific embodiment of the invention has been described herein, it will be understood that the construction shown is subject to numerous modifications and that applicants' invention is to be limited only by the scope of the appended claims.

What is claimed is:

1. In a cable-making machine, a spacer-carrying chain having spacer-receiving pockets therein for receiving slotted spacers, means for driving said chain, means operable in timed relation to the operation of the chain for feeding a spacer into each of said pockets, and means for forcing wires into the slots in the spacers.

2. In a cable-making machine, a spacer-carrying chain having spacer-receiving pockets therein for receiving slotted spacers, means for driving said chain, means operable in timed relation to the operation of the chain for feeding a spacer into each of said pockets, and means for forcing wires into the slots in the spacers while the spacers are in the pockets.

3. In a cable-making machine, a spacer-carrying chain having spacer-receiving pockets therein for receiving slotted spacers, means for driving said chain, means operable in timed relation to the operation of the chain for feeding a spacer into each of said pockets, and means for forcing wires into the slots in the spacers while the spacers are in the pockets comprising a plurality of rollers adjustable radially of the assembled wires and spacers.

4. In a cable-making machine, a spacer-carrying chain comprised of a plurality of links having slotted projections extending outwardly therefrom, said projections being spaced one from another to receive slotted spacers between them, means for directing a wire into the slots in said projections, a magazining device for feeding spacers into engagement with a wire in said slots, and means for moving the spacers to bring a slot therein into registration with said wire.

5. In a cable-making machine, a spacer-carrying chain comprised of a plurality of links having slotted projections extending outwardly therefrom, said projections being spaced one from another to receive slotted spacers between them, means for directing a wire into the slots in said projections, a magazining device for feeding spacers into engagement with a wire in said slots, means for moving the spacers to bring a slot therein into registration with said wire, and means for directing other wires into other slots in said slotted spacers.

6. In a cable-making machine, a spacer-carrying chain comprised of a plurality of links having slotted projections extending outwardly therefrom, said projections being spaced one from another to receive slotted spacers between them, means for directing a wire into the slots in said projections, a magazining device for feeding spacers into engagement with a wire in said slots, means for moving the spacers to bring a slot therein into registration with said wire, means for directing other wires into other slots in said slotted spacers, and rollers for forcing the wires a predetermined distance into each slot in the spacers.

7. In a cable-making machine, a spacer-carrying chain comprised of a plurality of links having slotted projections extending outwardly therefrom, said projections being spaced one from another to receive slotted spacers between them, means for directing a wire into the slots in said projections, a magazining device for feeding spacers into engagement with a wire in said slots, means for moving the spacers to bring a slot therein into registration with said wire, means for directing other wires into other slots in said slotted spacers, rollers for forcing the wires a predetermined distance into each slot in the spacers, brackets for supporting said rollers in a position to force the wires radically of the spacers, and means for effecting a fine adjustment of said rollers in a radial direction with respect to said spacers.

8. In a cable-making machine for assembling wires on slotted spacers, a set of rollers for forcing the wires into the slots in the spacers, means for advancing the spacers and wires, a bracket for supporting a roller in a position to force the wires radially of the spacers, and a threaded member adjustably interconnecting the bracket and roller for effecting micrometric adjustment of the distance the roller will force the wire into the slot in the washer.

9. In a machine for making a cable composed of a plurality of wires gripped in slots in spacers, means for feeding the spacers into engagement with one of the wires comprising a hopper for receiving a supply of spacers, means for carrying the spacers from the bottom of the hopper to the top thereof, a magazine extending into the hopper to receive the spacers from said carrying means, and rotatable means for withdrawing spacers one at a time from said magazine and directing them to the wire.

10. In a machine for making a cable composed of a plurality of wires gripped in slots in spacers, means for feeding the spacers into engagement with one of the wires comprising a hopper for receiving a supply of spacers, means for carrying the spacers from the bottom of the hopper to the top thereof, a magazine extending into the hopper to receive the spacers from said carrying means, and means for withdrawing spacers one at a time from said magazine and directing them to the wire while the wire is moving.

11. In a machine for making a cable composed of a plurality of wires gripped in slots in spacers, means for feeding the spacers into engagement with one of the wires comprising a hopper for receiving a supply of spacers, means for carrying the spacers from the bottom of the hopper to the top thereof, a magazine extending into the hopper to receive the spacers from said carrying means, and means for withdrawing spacers one at a time from said magazine and directing them to the wire while the wire is moving, including a rotatable member for tilting the spacers to a position at right angles to their position in the magazine.

12. In a machine for making a cable composed of slotted spacers and wires fixed in the slots in the spacers, means for feeding the spacers into engagement with one of the wires comprising means for advancing the wire, a drum for holding a supply of spacers comprised of a stationary basket and a rotatable plate, a ring fixed to said plate to carry spacers from the bottom of the drum to the top thereof, suction means for holding the spacers on said ring until they reach the top of the drum, a magazine extending into the drum and positioned to receive the spacers when they drop off said ring, a ring having pockets therein for picking the spacers from the hopper one at a time, a means on said ring last mentioned for tilting the spacers from a tangential to an axial position with respect to the ring, and means for rotating said last mentioned ring in timed relation to the advancement of the wire to feed spacers into engagement with the wire at spaced intervals.

GEORGE E. HENNING.
LILA T. JOHNSON,
*Executrix of the Estate of Fred V. Johnson, Deceased.*
SIGURD THRONSEN.